Jan. 22, 1924.
W. W. RICH
COCK
Filed Dec. 10, 1921
1,481,776
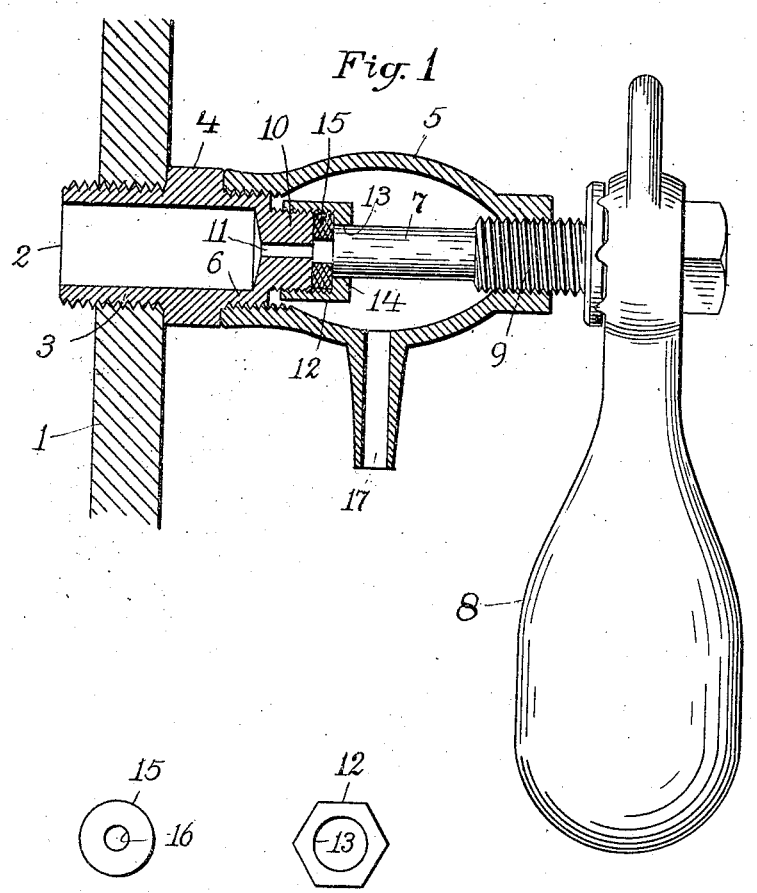

Patented Jan. 22, 1924.

1,481,776

UNITED STATES PATENT OFFICE.

WILLIAM W. RICH, OF WEST SOMERVILLE, MASSACHUSETTS.

COCK.

Application filed December 10, 1921. Serial No. 521,451.

*To all whom it may concern:*

Be it known that I, WILLIAM W. RICH, a citizen of the United States, residing at West Somerville, in the county of Middlesex and State of Massachusetts, have invented certain new and useful Improvements in Cocks, of which the following is a specification.

In the construction of gauge cocks it is customary to provide a conical valve stem seating against a concave valve seat. The difficulty which I find against this is its liability of leakage due to the grooving caused by escaping steam at high pressure, and the expense necessary for refitting the valve.

The object of this invention is the construction of a cock suitable for the above or other purposes, wherein such grooving and consequently leakage will seldom occur, and, if it does, the loss of time and the labor of rendering the cock as good as new will be reduced to the minimum.

To this end I provide the shank which screws into the boiler to which the cock is attached, with a suitably prepared washer, the steam being designed to escape through the central hole in the washer, and adapt the opening and closing members of the gauge cock to press a stem against the washer in a manner to completely close its central hole.

In the drawings forming part of this specification, Fig. 1 is a sectional elevation of a self-closing gauge cock embodying my invention. Fig. 2 is a face view of the washer used therein. Fig. 3 is a face view of the screw cap by means of which the washer is retained in place.

The reference numeral 1 designates a wall of a boiler for which the gauge cock is designed; 2 is the plug or shank having a threaded portion 3 to be screwed into the wall, and a shoulder 4 fitting an operating wrench; 5 is the body of the cock screwed tightly upon the threaded portion 6 of the shank 2; 7 is a valve stem having a threaded section 9 turning in the end of the body 5; and 8 is the weighted arm designed for normally holding the cock in its closed position.

The shank 2 terminates in an externally threaded nipple or nozzle 10 having a small axially disposed hole 11 through it, and having a screw cap 12 turning thereon. This screw cap is provided with a hole 13 larger in diameter than the hole 11, forming a flange or shoulder 14, and between this shoulder and the end of the nipple 10 is located a washer 15 constituting a valve seat the hole 16 through which is preferably larger than the hole 11 but less than the hole 13.

The hole 13 is slightly larger than the stem 7, and the end of the latter is moved toward and from the washer by suitably turning the stem, the screw threads 9 being preferably double in order to give a quick throw. I prefer so to arrange the weighted arm 8 that it acts to press the stem 7 snugly against the face of the washer 15, the opening of the valve being done by a pull applied to the projection 18 rising from the weighted arm 8. Hence the turn given to the valve stem 7 can be hardly more than a quadrant, and although the thread 9 is doubled, the distance thus made between the valve-end and the washer 15 is very slight and not enough to cause the withdrawal of the end of the stem out of the hole 13, and there is sure to ensue a wire-drawing of the escaping steam through such restricted passage. To prevent this, the hole 13 is made small enough to leave an annular space between its wall and the valve stem 7 more restricted than that between the washer 15 and the flat end of the valve when the valve is fully open, whereby the escaping steam is resisted in its passage through this annular space more than through the space between the washer and valve-end; and any wire-drawing and scoring will occur in the annular space alone, leaving the other surfaces uninjured. Since the grooving of the surfaces enclosing the annular space is unimportant, and the uninjured end of the valve is the surface which does the closing, this cock is rendered practically permanent.

When the stem 7 is turned to withdraw it from contact with the washer 15, the steam or water from the boiler passes into the interior of the body 5 and thence down through the vent 17.

Moreover, even without the coaction of the cylindrical surface of the stem and the wall around it, the area of the flat end of the stem against the face of the washer is so large as to ensure absolute steam-tightness thereat.

When, however, the washer 15 does after a long time become worn and inclined to leakage, it is the work of but a very few minutes to unscrew the cock body 5 from the shank 2, and the screw cap 12 from the nipple 10, and replace the old washer with a new one; leaving the shank 2 undisturbed in the boiler-wall.

Although I have shown the end of the stem 7 as flat, I do not restrict myself thereto, inasmuch as the end can be materially changed without departing from the spirit of my invention, which is essentially the provision of the seat of the cock with a removable wear-receiving member.

What I claim is:

1. A gauge cock comprising a valve seat having an axial opening through it, a washer located upon said seat and having an opening through it in alinement with that of the valve seat, a cap having a hole through it in axial alinement with said openings and enclosing said washer, and a valve movable through said hole to present its end against said washer and having means for giving it a limited retreat from the washer, the annular space between the valve and the wall of the hole in the cap being less than the space between said washer and valve-end when the latter is fully open, whereby the escape of steam when the valve is opened will meet with less resistance in passing between the washer and valve-end than in passing through said annular space, and the valve-end and washer will be protected against scoring and grooving.

2. A gauge cock comprising a valve seat having an axial opening through it, a washer located upon said seat and having an opening through it in alinement with that of the valve seat, a screw cap held by said valve seat having a hole through it and holding said washer in place, a valve stem having a threaded support in which it screws and having an end movable toward and from said washer through said hole, and a weighted arm adapted for normally retaining the end of said valve stem against said washer to prevent the escape of steam therethrough, and, when given a quarter-turn, to withdraw said end a limited distance from the washer, the annular space between said valve-stem and wall of said hole in the screw cap being less than the space between the washer and valve-end when said arm is given a quarter turn, whereby the resistance to the steam is greater in said annular space than between said washer and valve-end.

3. A gauge cock comprising a plug having a threaded portion at one end for screwing into the wall of a boiler and the like, a shoulder at its midlength, a threaded nozzle at the other end and a threaded section between the nozzle and shoulder, a chambered body screwed at one end on said threaded section, said plug and nozzle being centrally apertured, an apertured screw cap screwed upon said nozzle, an apertured washer confined between said cap and nozzle-end, and a stem having a flat end adapted to be moved through the aperture of the screw cap and pressed against the flat surface of the washer, said stem having a threaded portion turning in the outer end of said body, and said body having a vent.

In testimony that I claim the foregoing invention, I have hereunto set my hand this 7th day of December, 1921.

WILLIAM W. RICH.